(12) United States Patent
Biswas et al.

(10) Patent No.: US 10,410,247 B2
(45) Date of Patent: Sep. 10, 2019

(54) AUDIO DATA SAMPLING AND USER PROFILE GENERATION FOR ADVERTISEMENT CONTROL

(71) Applicant: Adobe Inc., San Jose, CA (US)

(72) Inventors: Sanjeev Kumar Biswas, Bangalore (IN); Charat Maheshwari, Noida (IN)

(73) Assignee: Adobe Inc., San Jose, CA (US)

( * ) Notice: Subject to any disclaimer, the term of this patent is extended or adjusted under 35 U.S.C. 154(b) by 451 days.

(21) Appl. No.: 14/597,597

(22) Filed: Jan. 15, 2015

(65) Prior Publication Data

US 2016/0210664 A1    Jul. 21, 2016

(51) Int. Cl.
*G06Q 30/02*    (2012.01)

(52) U.S. Cl.
CPC ................ *G06Q 30/0255* (2013.01)

(58) Field of Classification Search
CPC .................................................. G06Q 30/0255
USPC ......... 709/219; 725/18; 705/14.53; 713/176, 713/165
See application file for complete search history.

(56) References Cited

U.S. PATENT DOCUMENTS

| 8,943,172 | B2* | 1/2015 | Davis | G06Q 20/04 |
| | | | | 709/219 |
| 2001/0027412 | A1* | 10/2001 | Son | G06Q 30/02 |
| | | | | 705/14.53 |
| 2007/0083763 | A1* | 4/2007 | Itoh | H04L 9/3247 |
| | | | | 713/176 |
| 2016/0050457 | A1* | 2/2016 | Mondal | H04N 21/44204 |
| | | | | 725/18 |
| 2016/0110377 | A1* | 4/2016 | Yun | G06F 17/30174 |
| | | | | 713/165 |

FOREIGN PATENT DOCUMENTS

WO    WO-2005109207 A1 * 11/2005 ............. H04L 63/12

OTHER PUBLICATIONS

Advertising (Art & Copy, a 2009 documentary film about the advertising industry) (Year: 2009).*

* cited by examiner

*Primary Examiner* — Tarek Elchanti
(74) *Attorney, Agent, or Firm* — SBMC

(57) ABSTRACT

Audio sampling and user profile generation of advertisement control techniques are described. In one or more implementations, in a digital environment in which advertisements are dynamically selected for output and consumption by a user, a method is utilized to generate a user profile by one or more computing devices that serves as a basis for this dynamic selection. The method includes generating the user profile based on monitored consumption of content by a user, the consumption monitored through capture of audio data output in an environment of a user and identification of the audio data through comparison of hash values calculated from the captured audio data. The method also includes determining suitability of one or more of a plurality of advertisements for output to and consumption by the user based on the generated user profile and controlling output of the one or more of the plurality of advertisements to the user based on the determined suitability.

20 Claims, 7 Drawing Sheets

300 ⟶

⟵ 302

```
bool stat = CFFT::Forward(pSignal, N); // Apply the standard FFT
operation
int START = 28, END = 278;//322 hz - 3.23KHz declaring the range in
which Band#1 is analyzed
static int RANGE[] = {78,128,178,228, END+1};//         ⟵ 304
Double highscrores[5];//Array to store the top energy per 5 ranges
of frequency component per band
Double recordPoints[5];//Array to store the 5 frequency index or bin
numbers which has the highest energy per range per band
for(int freq= START; freq< (END - 1) ;++freq)//Looping through the
range
{
double mag =log( hypot( pSignal[freq].re() , pSignal[freq].im()) +
1);//computing power in log scale
int bin_index = getRangeBin(freq);//Get in which range this freq
falls into
if( mag > highscrores[range_index] )
{
highscrores[bin _index] = mag; //store the max energy for a given
range
recordPoints[bin _index] = freq; //store the freq which has the
highest energy in a given range
}
}
unsigned long hash = 0;//temp variable to store the unique hash
hash = Uniquehash
(recordPoints[0],recordPoints[1],recordPoints[2],recordPoints[3]);//
We just use the first 4 freq
int getRangeBin (int freq)//Function which returns 0,1,2,3,4 for the
5 ranges for a given frequency bin number
{
int i = 0;                                              ⟵ 306
while(RANGE[i] < freq ) i++;
return i;
} unsigned long Uniquehash ( unsigned long p1, unsigned long p2,
unsigned long p3, unsigned long p4)
{
//We are treating a bin number b, b+1 and b+2 as the same, this is
to have some tolerance
return (p4-((p4%3)>0?2:0)) * 100000000 + (p3-((p3%3)>0?2:0)) *
100000 + (p2-((p2%3)>0?2:0)) *100 + (p1-((p1%3)>0?2:0));
}
```

Fig. 3

AUDIO DATA SAMPLING AND USER PROFILE GENERATION FOR ADVERTISEMENT CONTROL

BACKGROUND

Marketers strive to provide relevant advertisements to potential consumers and thereby increase revenue for related goods or services. In order to do so, marketers attempt to identify these potential consumers. Conventionally, this was performed by identifying generalized demographics related to different marketing channels, such as consumers that watched particular television programs, listened to radio stations, read magazines, and so forth. The marketer would then supply advertisements to these marketing channels with hopes that this identification is correct.

Techniques were then subsequently developed to further focus demographics by monitoring online usage, such as which webpages a user viewed as well as detailed knowledge of the user, such as age and so on. Although this did improve knowledge of the user and thus accuracy of provision of advertisements to these potential consumers, this knowledge is still limited to online monitoring. Accordingly, a significant amount of user interaction with offline content is not utilized as conventional techniques did not have a mechanism for capturing this information.

SUMMARY

Audio sampling and user profile generation for advertisement control is described. In one or more implementations, in a digital environment in which advertisements are dynamically selected for output and consumption by a user, a method is utilized to generate a user profile by one or more computing devices that serves as a basis for this dynamic selection. The method includes generating the user profile based on monitored consumption of content by a user, the consumption monitored through capture of audio data output in an environment of a user and identification of the audio data through comparison of hash values calculated from the captured audio data. The method also includes determining suitability of one or more of a plurality of advertisements for output to and consumption by the user based on the generated user profile and controlling output of the one or more of the plurality of advertisements to the user based on the determined suitability.

In one or more implementations, in a digital environment in which advertisements are dynamically selected for output and consumption by a user, a method is described of controlling output of the advertisements using a user profile by one or more computing devices. The method includes sampling audio data output in an environment of the user that is representative of content consumed by a user, computing hash values of the sampled audio data to generate a user profile that describes the content consumed by the user, and outputting one or more of a plurality of advertisements that are determined suitable for output to the user based on the user profile generated at least in part using the computed hash values that describe the content consumed by the user.

In one or more implementations, in a digital environment in which advertisements are dynamically selected for output and consumption by a user, a system is described of controlling output of the advertisements using a user profile. The system includes an audio capture device configured to sample audio data output in an environment of the user that is representative of content consumed by a user, a hash module implemented at least partially in hardware and configured to compute hash values of the sampled audio data to generate a user profile that describes the content consumed by the user, and an advertisement selection module implemented at least partially in hardware and configured to control output of one or more of a plurality of advertisements that are determined suitable for output to the user based on the user profile generated at least in part using the computing hash values that describe the content consumed by the user.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 3 depicts an example of pseudo code usable to compute a hash value of FIG. 2.

DETAILED DESCRIPTION

Overview

Retailers offer advertisements having specialized opportunities in order to increase sales, such as discounts and so on to potential consumers. Conventionally, this is done through some online websites, printed advertisements, and so forth. However, conventional techniques that are utilized to disseminate these advertisements could be inefficient and inaccurate as it is difficult using these conventional techniques to identify potential consumers that are interested in the goods or services being offered. For example, although some conventional techniques have been developed to leverage online behavior of users, these conventional techniques could not and did not have a mechanism by which to leverage the offline behavior of the users.

Accordingly, user profile and audio sampling techniques are described to control output of advertisements to users. These techniques are configured to capture offline user behavior through identification of audio that is output in a user's environment. The user, for instance, may carry about a mobile device such as a mobile phone, tablet, and so forth. The mobile device includes an application that is executed in the background to capture samples of audio data from the user's environment. These audio samples are usable to identify content consumed by the offline, such as television broadcasts, radio broadcasts, background audio output at an establishment (e.g., background music and advertisements), and so forth. Through sampling, resource consumption of the mobile device is conserved yet still supports a technique to monitor the user's consumption of content.

The captured audio data is then used to generate hash values that, through comparison with a pre-computed list of hash values is usable to identify the captured audio data. In this way, a determination may be made as far as which content has been consumed by the user offline, which is then used to generate a user profile describing this consumption. The user profile is then used to control which advertisements are to be output to the user, such as to make a special offer based on monitored interest of a user in consuming an entirety of advertisements related to a good or service that is a subject of the offer, and thus has exhibited interest in the good or service. A variety of other examples are also contemplated, further discussion of which is described in the following sections and shown in corresponding figures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
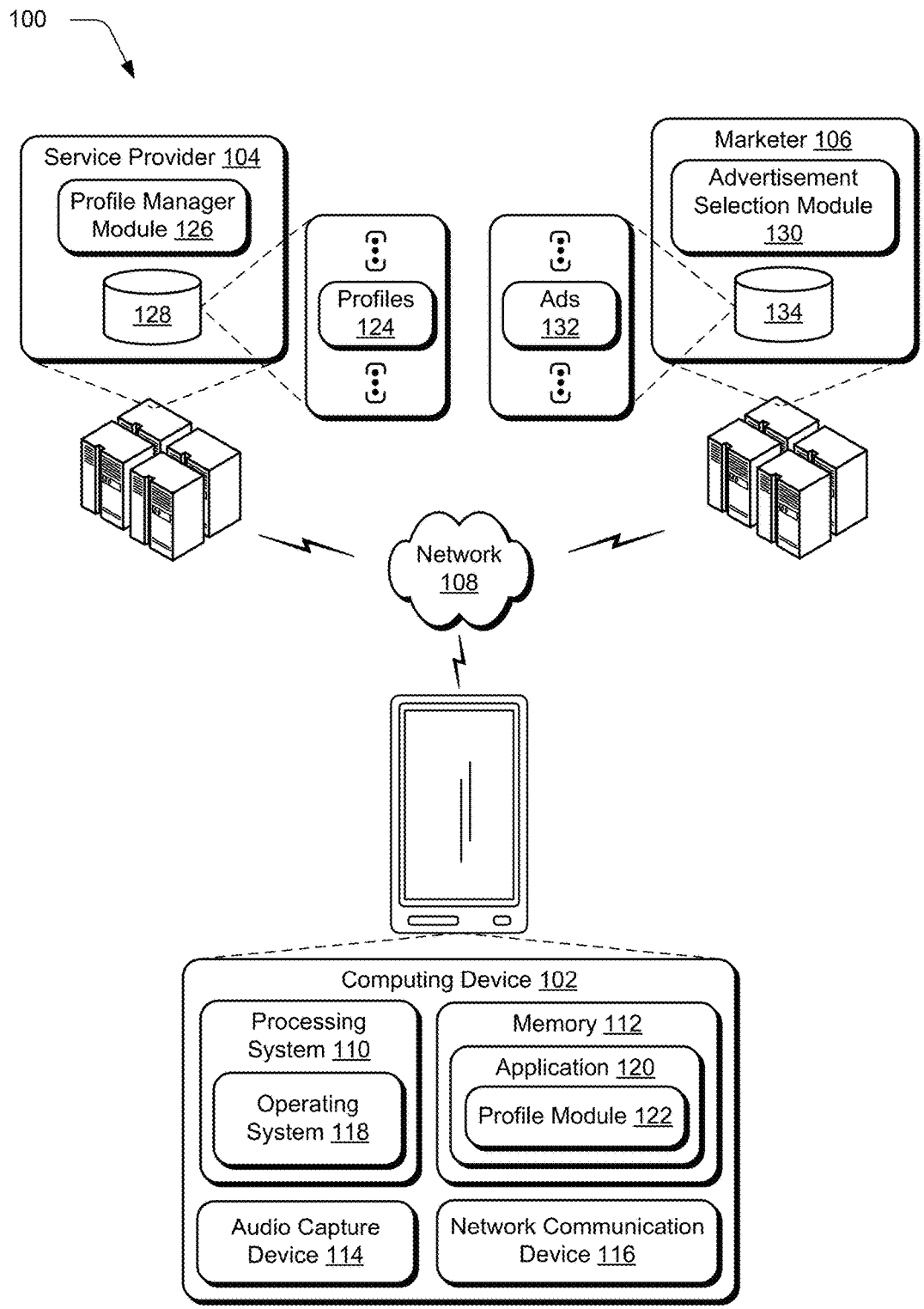
FIG. 1 is an illustration of an environment in an example implementation that is operable to employ user profile and audio sampling techniques described herein.

FIG. 1 is an illustration of an environment 100 in an example implementation that is operable to employ user profile and audio sampling techniques described herein. The illustrated environment 100 is an example of a digital environment in which advertisements are dynamically selected for output and consumption by a user. The environment 100 includes a computing device 102, a service provider 104, and a marketer 106 that are communicatively coupled, one to another, via a network 108. Computing devices that implement the computing device 102 as well as the service provider 104 and the marketer 106 are configurable in a variety of ways.

Computing devices, for instance, are configurable as a desktop computer, a laptop computer, a mobile device (e.g., assuming a handheld configuration such as a tablet or mobile phone), and so forth. Thus, computing devices range from full resource devices with substantial memory and processor resources (e.g., personal computers, game consoles) to a low-resource device with limited memory and/or processing resources (e.g., mobile devices). Additionally, although a single computing device is shown, the computing device is also representative of a plurality of different devices, such as multiple servers utilized by a business to perform operations "over the cloud" as illustrated for the service provider 104 and the marketer 106 and as further described in relation to FIG. 7.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 be configured to include multiple networks.

The computing device 102 is illustrated as including a variety of hardware components, examples of which include a processing system 110, an example of a computer-readable storage medium illustrated as memory 112, an audio capture device 114, a network communication device 116, and so on. The processing system 110 is representative of functionality to perform operations through execution of instructions stored in the memory 112. Although illustrated separately, functionality of these components may be further divided, combined (e.g., on an application specific integrated circuit), and so forth.

The audio capture device 114 is configured to capture audio from an environment in which the computing device 102 is disposed (i.e., the surroundings of the computing device 102), such as through use of a microphone to capture audio data that is then stored in memory 112. The network communication device 116 is representative of a device configured to support communication via the network 108, and as such includes both wired and wireless configurations.

The computing device 102 is further illustrated as including an operating system 118. The operating system 118 is configured to abstract underlying functionality of the computing device 102 to applications 120 that are executable on the computing device 102. For example, the operating system 118 may abstract processing system 110, memory 112, audio capture device 114, network communication device 116, or other functionality of the computing device 102 such that the applications 120 may be written without knowing "how" this underlying functionality is implemented. The application 120, for instance, may provide data to the operating system 118 to be rendered and displayed by a display device or printer without understanding how this rendering will be performed. The operating system 118 may also represent a variety of other functionality, such as to manage a file system and user interface that is navigable by a user of the computing device 102.

The computing device 102 is also illustrated as including a profile module 122 that is representative of functionality to generate data that is usable to create a profile 124 describing offline interaction by a user of the computing device 102 with content. Although the profile module 122 is illustrated as part of the application 120, functionality represented by the profile module 122 may be implemented as a stand-alone application, third-party plugin module, as part of the operating system 118, and so on.

The profile module 122 is configured to capture samples of audio data of a user's surroundings using the audio capture device 114. Other samples are also contemplated, such as through analysis of stored audio data on the computing device 102. Regardless of how captured, these samples may then be communicated to the service provider 104 for processing by a profile manager module 126. The profile manager module 126 is representative of functionality to generate and manage profiles 124, which are illustrated as stored in storage 128, that describe offline and even online content consumption by a user. In another example, functionality of the profile manager module 126 is also implemented locally on the computing device 102 with the profile module 122.

The profiles 124 are configured to describe offline consumption of content through sampling of audio data in a user's surroundings, such as television programming, radio broadcasts, background audio in an establishment, and so on. This includes which content has been consumed as well as a duration of the consumption, which may be indicative of a user's level of interest in the content.

The profiles 124 support a variety of different functionality. For example, a marketer 106 includes an advertisement selection module 130 that is representative of functionality to control selection of advertisements 132 (also referred to as ads herein) that are illustrated as maintained in storage 134 and are configured to be output for consumption by a user based on the profiles 124. The ads 132 are consumable in a variety of ways, such as in an online digital environment as a banner ad, embedded ad, video, and so forth. Other examples include offline implementations such as printed ads, brochures, and so forth. In this way, the profile 124 supports selection of ads 132 that have an increased likelihood of being of interest to a user by leveraging knowledge of offline consumption of content in a manner that is not possible using conventional techniques. An example of audio sampling and user profile generation is described in the following and shown in a corresponding figure.

Figure 2:
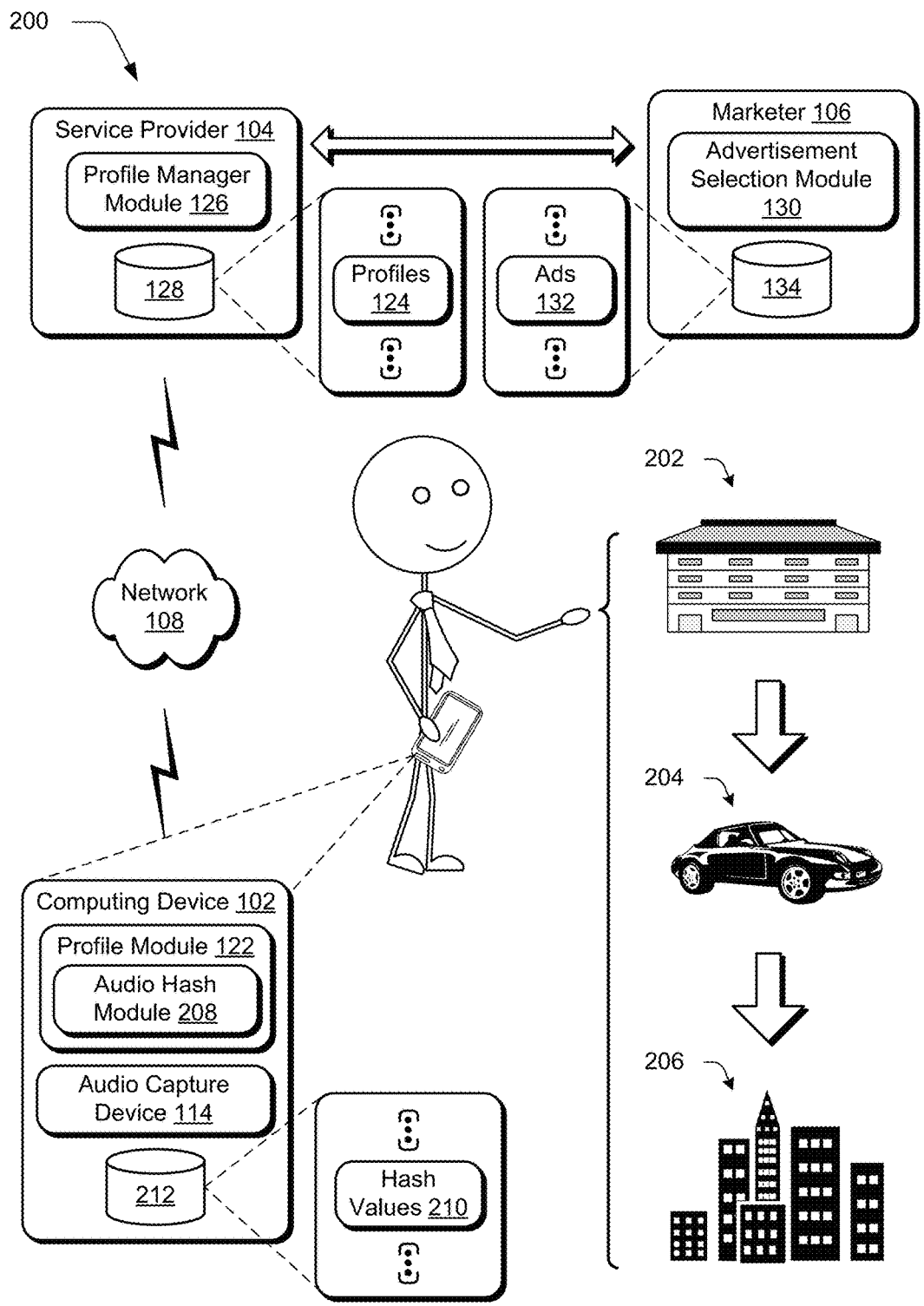
FIG. 2 depicts a system in an example implementation showing operation of a profile module and a profile manager module of FIG. 1 in greater detail.

FIG. 2 depicts a system 200 in an example implementation showing operation of the profile module 122 of profile manager module 126 of FIG. 1 in greater detail. As previously described, conventional techniques are limited to online data collection, solely, and thus miss a significant amount of content consumed by a user. A user, for example, consumes a significant amount of content offline, such as through listening to a radio broadcast on an average of 45-65 minutes a day, watching television for hours at a time, and so forth, which would be missed under conventional techniques. Accordingly, the profile module 122 is configured to support techniques to identify this offline content that is consumed by a user and use it for a basis of forming the profiles 124.

In the illustrated example, for instance, a user during a typical day travels between a home 202 and commutes via car 204 to an office 206 and back. The profile module 122 is configured to sample audio data through use of an audio capture device 114 from these different environments, such as television programs at home 202, a radio broadcast in the car 204, background audio in an elevator at work 206, and so forth. For example, the profile module 122 may be configured as part of an application 120 that is executed in a background, e.g., periodically launched at defined intervals to sample the audio data.

As part of this sampling, the profile module 122 employs an audio hash module 208 that is configured to generate hash values 210 from the sampled audio data, which are illustrated as stored in storage 212 of the computing device 102. In this way, processing, memory, a battery resources of the computing device 102 are conserved, thereby permitting use in mobile applications such as a mobile phone or tablet as illustrated.

The hash values 210 are communicated in the illustrated example to the profile manager module 126, which is configured to identify the content consumed by a user of the computing device 102. This includes content such as television programs, songs on the radio, and so on as well as consumption of other advertisements. For example, the hash values 210 computed from the audio data are compared to a list of pre-computed hash values of known content to locate a match and thus identify the content. This comparison may also serve as a basis to determine an amount of the content that was consumed, such as to identifying that a sequence of hash values 210 indicate that a corresponding amount of content is consumed of a particular item of content through comparison with the list as described above. Thus, the profiles 124 are configurable to identify content consumed by a user as well as how much of that content was consumed.

The profiles 124 are then used by a marketer 206 to select ads 132 that are to be output for consumption by the user. In this way, the marketer 206 leverages knowledge of offline content consumption that is usable to identify potential likes and dislikes of the user and thus increase a likelihood of providing ads 132 of interest to the user and thus an increase in potential revenue to the marketer 206. A variety of different usage scenarios are supportable by this system 200.

In a first such scenario, every marketer 206 that has a presence in the form of a radio or television ad shares audio data of those ads with the service provider 104. The profile manager module 126 of the service provider creates a hash map including hashes and corresponding content and binds it with the ads as a list of pre-computed hash values that are computed offline such that the corresponding content is locatable later from the hash values.

A client-side application 120 includes an integrated profile module 122 and audio hash module 208 and is installed on a computing device 102 of a user. Upon selection of an option by the user to permit the execution of the application 120 in the background, the profile module 122 is executed at predefined points in time (e.g., periodically) to capture audio data using the audio capture device 114. Accordingly, the profile module 122 keeps capturing a small sample of the sound around the user's environment and computes hash values 210 for it.

In this example, the pre-computed list of hash values are communicated from the service provider 104 to the computing device 102. The profile module 122 then matches the hash values 210 taken from the environment with the pre-computed list of hash values received from the service provider 104 to identify content from the captured audio data, such as to identify the ads 132 of the marketer 206 as described earlier in this example. Once the profile module 122 determines that a particular ad has been consumed above a threshold number of times, this information is communicated to the profile manager module 126, which is added to a profile 124 of the user. As part of this, a determination may also be made to ensure that at least a threshold amount of the content (e.g., the ad) has been consumed, such as through use of a sequence of hash values 210 as previously described.

The profile manager module 126 keeps updating the profile 124 of the user in this manner. This may include tracking how many times a user listened to the ad, how long the user listened to the ad, and so forth. Once the profile 124 reaches a defined state, this triggers the marketer 206 to offer special personalized deals for the user, e.g., to be served particular ads 132 based on consumption of previous ads by the user. Thus, the marketer 206 may leverage the profiles 124 and run business logic to see if the user is eligible for a targeted ad (e.g., deals, coupons, personalized printed brochure, and so forth) and thus the user has an increased likelihood of being presented with an advertisement of interest by leveraging offline information of the user.

The hash values 210 may be calculated by the audio hash module 208 in a variety of ways. An example of pseudo code 300 to compute these hash values 210 is shown in FIG. 3. In this example, the input is a raw audio file, captured at 44.1 KHz. A Fast Fourier Transform (FFT) is computed at 302 using a 4096 window size. A first half of a FFT array is used, i.e., 0-2047 index, because 44100 Hz is equally divided into 4096 bins, so frequency per bin is 44100/4096 is equal to 10.76 Hz/bin.

Figure 4:
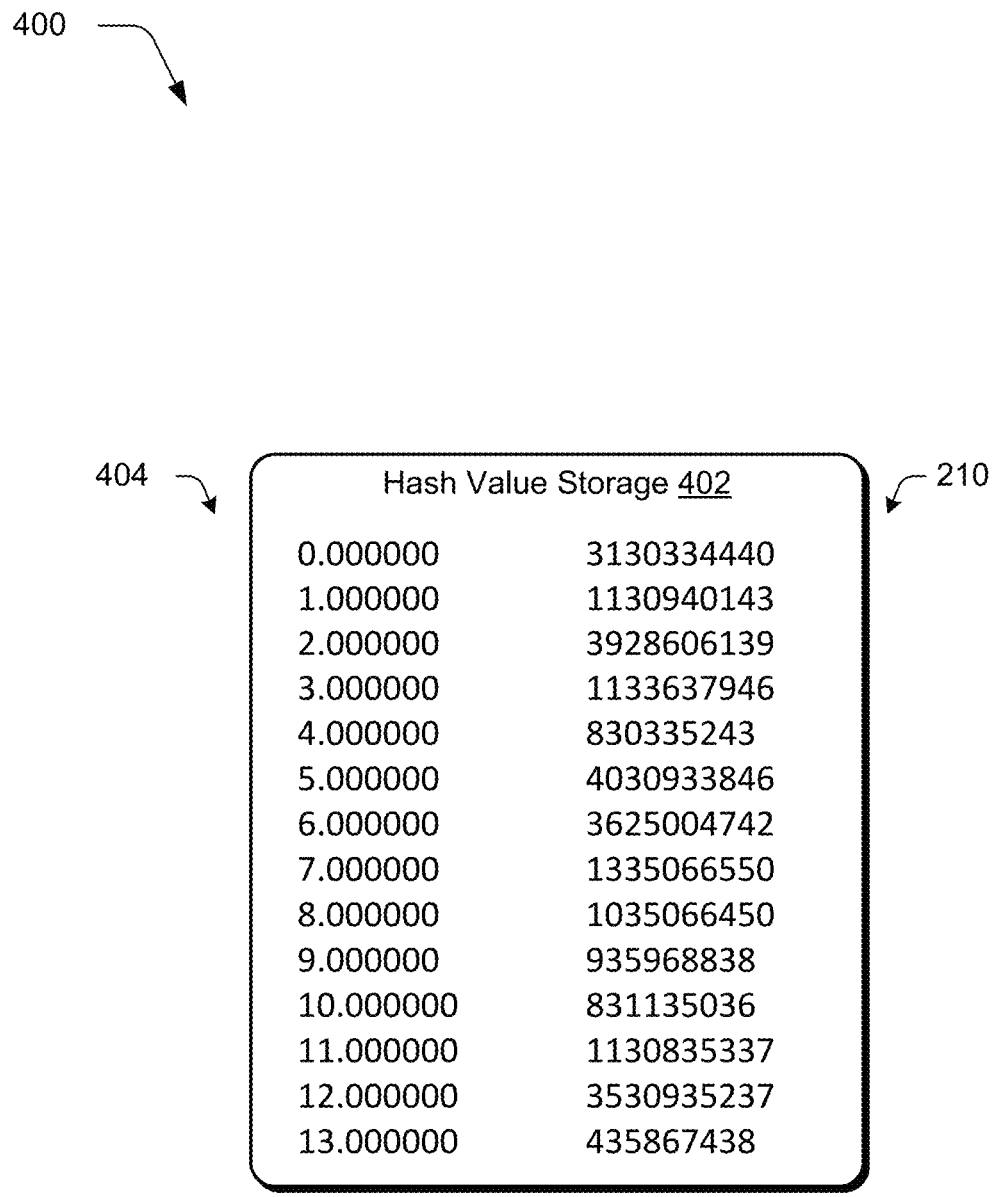
FIG. 4 depicts an example of a result of a computation of FIG. 3.

At 304, frequency bands having ranges of 28-78, 79-128, 129-178, 179-228, and 229-278 are defined, which as illustrated as a double highscores array use to store the top energy per five ranges of frequency components per band. Then for each such range in each band a bin index (e.g., frequency component) is computed that has the highest power. Accordingly, for each of these ranges a single frequency component is obtained, such that five such frequency components are obtained at 306. An example output 400 of this example pseudo code 300 is shown in FIG. 4, which is illustrated as hash value storage 402. The left column is a time index 404 (e.g., in seconds) and the right column includes the hash values 210 computed using the example techniques described above.

As part of an example client workflow performed by the computing device 102, when the profile module 122 comes online and after user login, a list of pre-computed hash time/series values is obtained for each supported advertisement that is supported. For example, if the profile module 122 is included in an application corresponding to a particular marketer 206 then the hash values for advertisements from that marketer 206 are obtained. The audio hash module 208 then computes hash values 210 from captured audio samples using a FFT as previously described.

The hash values 210 are then used to perform a lookup using the locally stored pre-computed has time/series values. If there is a match, this information is returned to the application 120 and if not, a failure is returned. In one or more implementations, if multiple matches are found then a success a returned, as in this implementation the local database may be utilized for ads 132 from more than one marketer 206.

The profile module 122 may also perform operations to track an amount of consumption of the content, e.g., the ads in this example. For example, once the profile module 122 detects an advertisement for the first time at time "T0," the same detection is performed again at time "T1." If at time "T1" the profile module 122 detects the same ad (e.g., through matching another hash value), then the match is considered a "perfect" match. Assuming a duration of the ad is "D," which is also maintained locally at the computing device 102, then a threshold amount in this example is satisfied if "(T1−T0)<=D." If satisfied, the information is sent to the service provider 104.

Once the profile manager module 126 receives this data, the profile 124 is updated by augmenting the data that describes the offline consumption of content. For example, profile 124 for user "u" is denoted as "O(u)" in the following. The profile 124 "O(u)" is configured as an array having the following structure:

Struct UserListeningInfo

```
{
  UINT _Ad_id;
  History _hist_;
  UINT _count_;
};
```

The value "History" is a data type that holds a pattern depicting listening behavior of a user per defined amount of time, e.g., per day, per hour, and so on, an example of which follows:

hist[$1^{st}$ April 2013]=2
hist[$3^{rd}$ April 2013]=4
hist[$5^{th}$ April 2013]=5

The value "Ad_id" is a unique identifier for a given Ad 132 that has been registered by the service provider 104. The value "Count" is an integer which holds the number of times a user has consumed the Ad starting from a particular point in time. The more a user listens to an ad, the more the profile 124 is updated.

In one or more implementations, the marketer 206 may log into a portal provided by the profile manager module 126 of the service provider 104 to access a profile distribution. The profile distribution, for instance, describes which ads 132 are listened to the most by users, which user is listening to a particular ad 132 on a daily basis, and so on. The marketer 206 may then send a particular advertisement to that user, such as a special discount offer to the user. Thus, these profiles 124 support targeted ad campaigns for that user and similar users.

For example, a user may download an application 120 for a fast food restaurant from an online application store, which is the marketer 206 in this example. The fast food restaurant has created three advertisements, which are provided to the service provider 102 for pre-computation of a list of hash values which are provided to the computing device 102 of the user.

When traveling from the office 206 to the user's home 202 in a car 204, during which the user listens to one of the ads of the fast food restaurant. The profile module 122 detects this and uploads this data to the profile manager module 126 of the service provider 104, which is also updated to indicate a number of times that ad has been consumed.

The fast food restaurant, i.e., the marketer 206 in this example, is then notified in real time about this data. In response, the fast food restaurant may provide a special offer to the user, which is configured and deployed through the service provider 104, the marketer 206, or elsewhere.

In another example, photography services customers using a mobile application of a photographic service detect a variety of advertisements, both from the photographic service and other related advertisements. Thus, if consumption of an advertisement from a different photographic service is detected, the photographic service may provide an offer for similar products or services. In a further example, the profile module 122 detects that a user has consumed a number of advertisements related to furniture. The marketer 206 then provides furniture offers the next time the user logs in to a website of the marketer 206, e.g., an online retailer. Thus, a variety of different usage scenarios are supported through audio sampling and user profile generation for advertisement control, further discussion of which may be found in relation to the following procedures.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
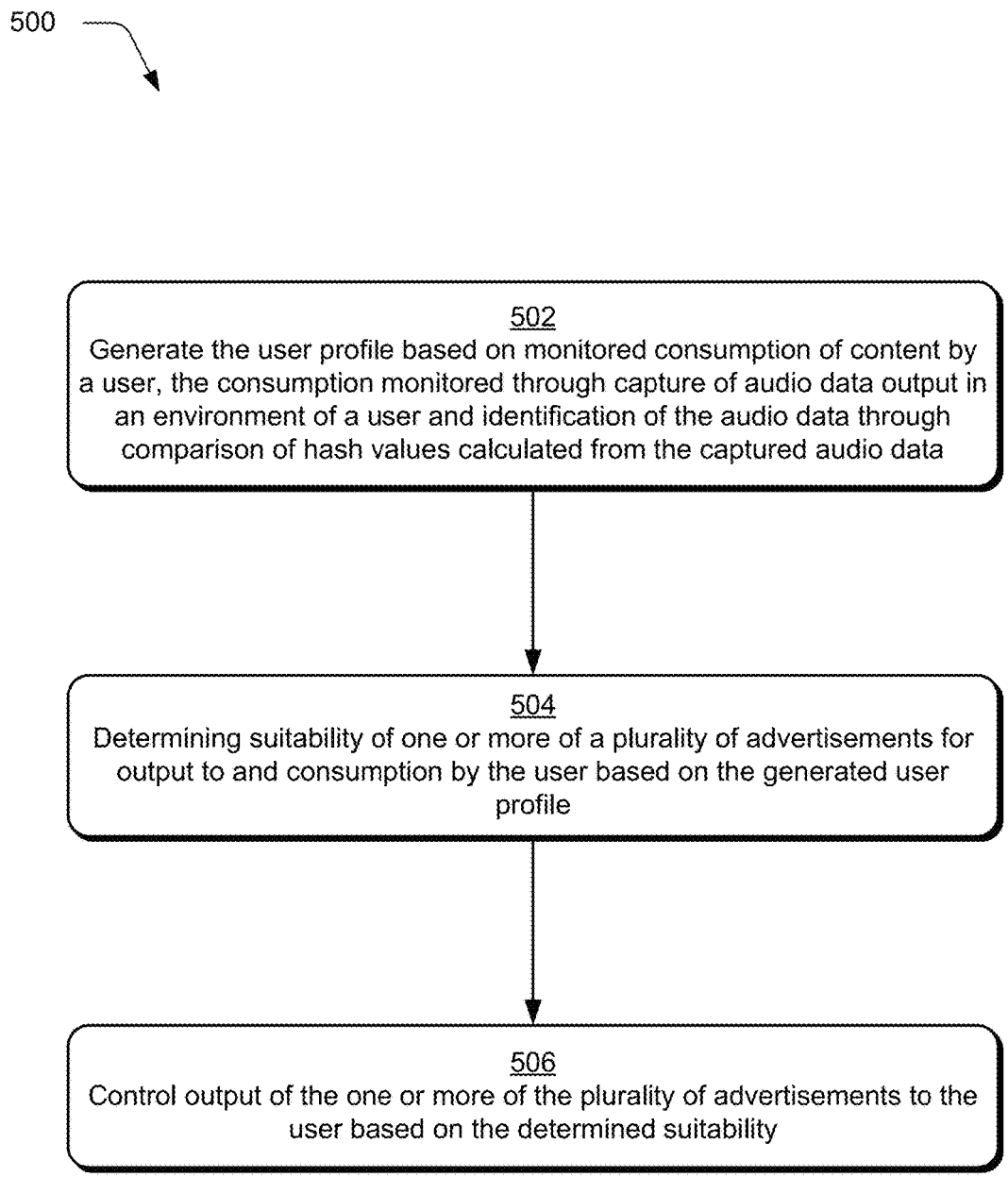
FIG. 5 is a flow diagram depicting a procedure in an example implementation in which a user profile is generated and used to dynamically select advertisements for output to a user.

FIG. 5 depicts a procedure 500 in an example implementation in which a user profile is generated and used to dynamically select advertisements for output to a user. In a digital environment in which advertisements are dynamically selected for output and consumption by a user, a method is utilized to generate a user profile by one or more computing devices that serves as a basis for this dynamic selection.

The following includes a description of generating the user profile based on monitored consumption of content by a user, the consumption monitored through capture of audio data output in an environment of a user and identification of the audio data through comparison of hash values calculated from the captured audio data (block 502), which includes computation of hash values which are used to determine content with which the user has interacted as described above. The computing device 102, for instance, uses an audio capture device 114 to capture samples of audio data from an environment surrounding the device. The audio hash module 208 then generates hash values 210 that are compared with a pre-computed list of hash values to identify the content from which the samples are taken. This identification is then used to generate a profile 124 that describes this offline consumption of content.

Suitability of one or more of a plurality of advertisements is determined for output to and consumption by the user based on the generated user profile (block 504). The advertisements, for instance, may be selected based on thresholds involving a number of times particular advertisements are consumed, an amount of consumption of the advertisements, and demographic information describing a user. This may also include online profile information, such as that generated through monitored user interaction online to consume particular webpages, advertisements, or other content.

Output is controlled of the one or more of the plurality of advertisements to the user based on the determined suitability (block 506). As previously described, this may include a corresponding of advertisements based on consumption of other advertisements of a particular marketer 106, other marketers 106, types of goods or services, and so forth.

Figure 6:
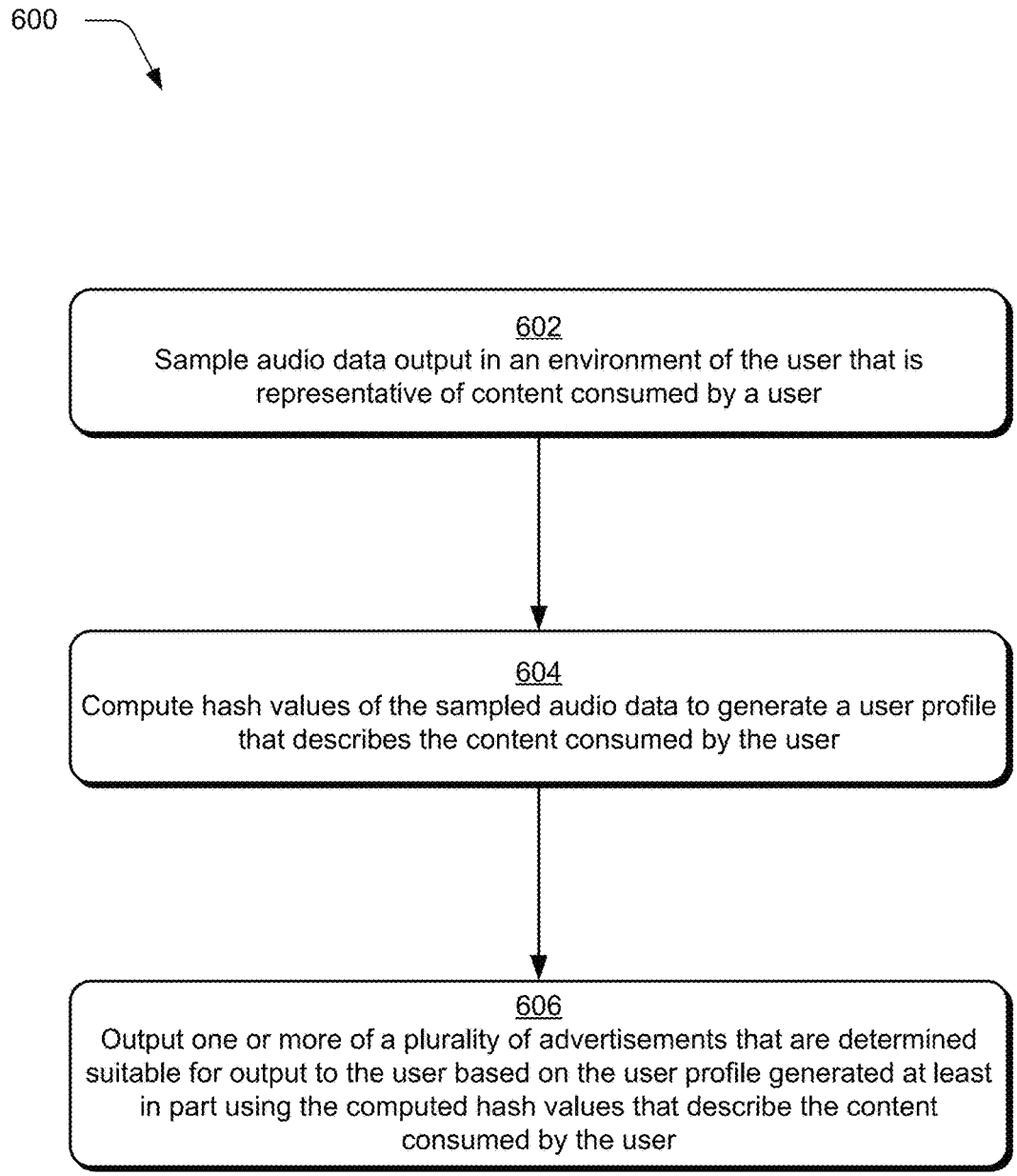
FIG. 6 is a flow diagram depicting a procedure in an example implementation in which audio data is sampled and used as a basis to determine suitability of advertisements for output to a user.

FIG. 6 depicts a procedure 600 in an example implementation in which audio data is sampled and used as a basis to determine suitability of advertisements for output to a user. In a digital environment in which advertisements are dynamically selected for output and consumption by a user, a method is described of controlling output of the advertisements using a user profile by one or more computing devices.

The method includes sampling audio data output in an environment of the user that is representative of content consumed by a user (block 602). The audio data, for instance, includes television programs, radio broadcasts, background audio, and so forth. Further, the audio data may correspond to a variety of content, such as programs or music itself, advertisements, and so forth.

Hash values are computed of the sampled audio data to generate a user profile that describes the content consumed by the user (block 604). The hash values, for instance, are generated as a Fast Fourier Transform (FFT) using bins corresponding to ranges of frequencies.

One or more of a plurality of advertisements are output that are determined suitable for output to the user based on the user profile generated at least in part using the computed hash values that describe the content consumed by the user (block 606). Continuing with the previous example, the hash values are used to generate profiles 124 which are then usable to select advertisements, locally at the computing device 102 (e.g., through local implementation of the advertisement selection module 230 at the computing device 102) or remotely, e.g., via the service provider 104 and/or the marketer 106. A variety of other examples are also contemplated as previously described.

Example System and Device

Figure 7:
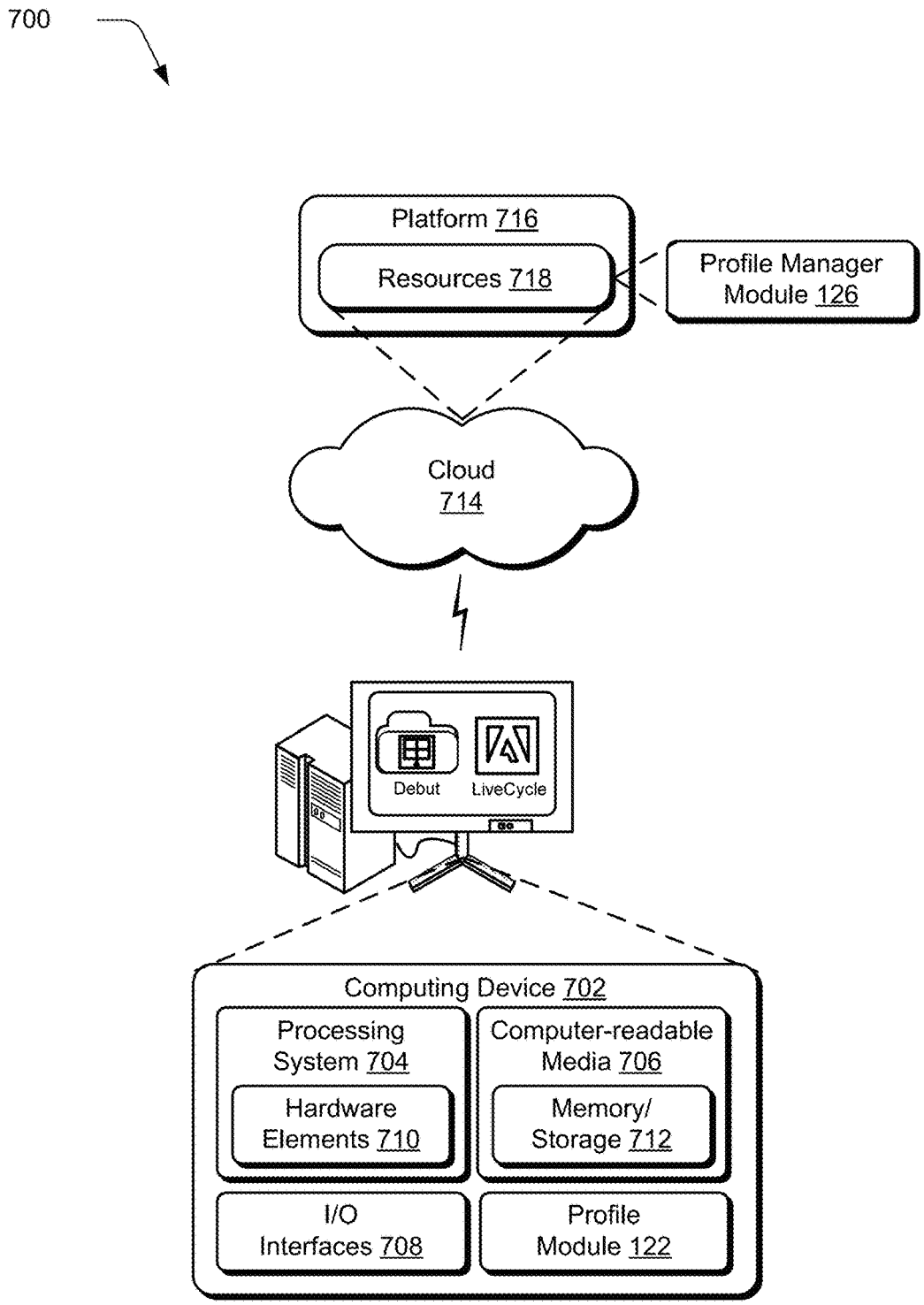
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the profile module 122 and the profile manager module 126, which may be configured to process image data, such as image data captured by an image capture device 104. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate a user profile for use in dynamically selecting advertisements for output and consumption by a user, a method implemented by one or more computing devices, the method comprising:

receiving with a hash module implemented at least partially in hardware of the one or more computing devices, from a service provider via a network, a list of calculated hash values generated from reference content, the receiving the list of calculated hash values responsive to the hash module coming online and a user login;

generating, with the hash module, audio hash values from audio data captured with an audio capture device output in an environment of the user, the audio hash values determined by summing a plurality of values determined from respective frequencies having largest respective energies in respective frequency ranges of the audio data;

determining, with the hash module, content consumed by the user by comparing the audio hash values to the calculated hash values in the list of calculated hash values;

determining, with the hash module, that a threshold amount of the content has been consumed by the user;

generating, with the hash module, the user profile for the user based on the content for which the threshold amount has been consumed;

determining, with an advertisement selection module implemented at least partially in hardware of the one or more computing devices, suitability of one or more of a plurality of advertisements for output to and consumption by the user based on the user profile; and controlling, with the advertisement selection module, output of the one or more of the plurality of advertisements to the user based on the determined suitability.

2. The method as described in claim 1, wherein the audio data is not output by the one or more computing device.

3. The method as described in claim 1, wherein the determination of the content for which the threshold amount has been consumed is performed locally to the user and, responsive to the determination that the threshold amount of the content has been consumed, a communication is transmitted to communicate the calculated hash values via the network that is received and used to perform the generating the user profile.

4. The method as described in claim 1, wherein the consumption of the content is monitored through background execution of an application by a computing device associated with the user.

5. The method as described in claim 1, wherein the profile describes a number of times the content is consumed by the user and an amount of time the content is consumed by the user.

6. The method as described in claim 1, wherein the advertisement is configured as an online advertisement or a printed advertisement.

7. The method as described in claim 1, wherein the content is an advertisement.

8. The method as described in claim 1, wherein the audio data is captured from a television broadcast, radio broadcast, or background audio at an establishment.

9. In a digital medium environment to dynamically select advertisements for output and consumption by a user, a method implemented by one or more computing devices, the method comprising:

receiving with a hash module implemented at least partially in hardware of the one or more computing devices, from a service provider via a network, a list of calculated hash values generated from reference content, the receiving the list of calculated hash values responsive to the hash module coming online and a user login;

sampling, with an audio capture device implemented at least partially in hardware, audio data output in an environment of the user;

computing, with the hash module, audio hash values of the sampled audio data, the audio hash values determined by summing a plurality of values determined from respective frequencies having largest respective energies in respective frequency ranges of the sampled audio data;

determining, with the hash module, content consumed by the user by comparing the audio hash values to the calculated hash values in the list of calculated hash values;

generating, with the hash module, a user profile for the user based on the comparing; and outputting, with an advertisement selection module implemented at least partially in hardware of the one or more computing devices, one or more of a plurality of advertisements that are determined suitable for output to the user based on the user profile.

10. The method as described in claim 9, wherein the user profile is generated based at least in part for that content for which it has been determined that at least a threshold amount of the content has been consumed.

11. The method as described in claim 10, wherein the threshold amount is determined based on identification of a plurality of hash values computed from the audio data, a collection of which is indicative that the threshold amount has been consumed.

12. In a digital environment in which advertisements are dynamically selected for output and consumption by a user, a system comprising:

an audio capture device implemented at least partially in hardware configured to sample audio data output by a different device in an environment of the user that is representative of content consumed by the user;

a hash module implemented at least partially in hardware and configured to:
compute audio hash values of the sampled audio data, the audio hash values determined by summing a plurality of values determined from respective frequencies having largest respective energies in respective frequency ranges of the sampled audio data;
receive responsive to the hash module coming online and a user login, from a service provider via a network, a list of calculated hash values generated from reference content; and
generate a user profile for the user that describes the content consumed by the user based on a comparison of the audio hash values to the calculated hash values of the reference content in the list of calculated hash values; and an advertisement selection module implemented at least partially in hardware and configured to control output of one or more of a plurality of advertisements that are determined suitable for output to the user based on the user profile generated at least in part using the audio hash values that describe the content consumed by the user.

13. The system as described in claim 12, wherein the user profile is generated based at least in part for that content for which it has been determined that at least a threshold amount of the content has been consumed.

14. The system as described in claim 13, wherein the threshold amount is determined based on identification of a plurality of hash values computed from the audio data, a collection of which is indicative that the threshold amount has been consumed.

15. The method as described in claim 1, wherein the reference content is received from a source remote to the user.

16. The method as described in claim 1, wherein the list is formed by binding a hash map including the calculated hash values and corresponding content with the corresponding content such that the corresponding content is locatable from the calculated hash values.

17. The method as described in claim 1, wherein the summing is according to $(p4-((p4\%3)>0?2:0))*100000000+(p3-((p3\%3)>0?2:0))*100000+(p2-((p2\%3)>0?2:0))*100+(p1-((p1\%3)>0?2:0))$.

18. The method as described in claim 1, wherein the determining that the threshold amount of the content has been consumed is based on:
- matching a first audio hash value to a first calculated hash value at a first time;
- matching a second audio hash value to a second calculated hash value at a second time; and
- determining that a difference between the second time and the first time is less than a duration of the content.

19. The method as described in claim 9, wherein the comparing the audio hash values to the calculated hash values includes identifying a sequence of the audio hash values that indicate an amount of the content consumed.

20. The system as described in claim 12, wherein the audio hash values are computed periodically at predefined points in time.

* * * * *